United States Patent [19]

Chang et al.

[11] Patent Number: 4,767,192

[45] Date of Patent: Aug. 30, 1988

[54] LIGHT ACTIVATED LIGHT VALVE WITH A SILICON CONTROL ELEMENT

[75] Inventors: Ifay F. Chang, Chappaqua, N.Y.; Eugene I. Gordon, Convent Station, N.J.

[73] Assignee: International Business Machines Corporation, Armonk, N.Y.

[21] Appl. No.: 925,343

[22] Filed: Oct. 31, 1986

[51] Int. Cl.[4] .......................... G02F 1/13; H01L 27/14
[52] U.S. Cl. ..................................... 350/342; 350/332; 350/331 R; 357/30
[58] Field of Search .................... 350/332, 331 R, 342; 357/30 P

[56] References Cited

U.S. PATENT DOCUMENTS 4,032,954  6/1977  Grinberg et al. ................... 350/342
4,191,452  3/1980  Grinberg et al. ................... 350/342
4,345,248  0/1982  Togashi et al. ..................... 340/784

FOREIGN PATENT DOCUMENTS 0111368  8/1979  Japan ............................. 350/331 R

OTHER PUBLICATIONS

Hong et al., "Application of the LCLV to a Large Screen Graphics Display", SID Digest, May 1979.
"LALCLV for Projection Displays", IBM Technical Disclosure Bulletin, vol. 28, No. 4, 9-1985.
Bleha, W. P. et al., *Proceedings SPIE*, vol. 317, pp. 179 et seq., 1981.
Chang, I. F., *Nonemissive Electro-Optic Display*, Edited by A. Kmetz and F. K. Von Willisen, Plenum Press, 1978.
Chang, I. F. et al., "Bistable Storage Tube with AC Voltage Controlled Display Element," *Proc. S.I.D.*, vol. 16, No. 4, pp. 227-233 (1975).

*Primary Examiner*—Stanley D. Miller
*Assistant Examiner*—Trong Quang Phan
*Attorney, Agent, or Firm*—Thomas P. Dowd; Marc D. Schechter

[57] ABSTRACT

In contrast to existing light addressed light valves for projection displays which use a homogeneous CdS or Se photoconductive layer as the control element for a liquid crystal cell, a silicon photo-diode array is disclosed which makes an effective control element capable of applying a spatially varying AC voltage across a liquid crystal light valve. Writing may be done with a miniature CRT in an optical or electron excitation mode. It is shown that for a video mode the ratio of diode capacitance to liquid crystal cell capacitance associated with the diode, and the frequency of the applied square wave voltage, define the buildup or decay time of the liquid crystal cell voltage. Thus, the frequency of the applied AC voltage can be used to control sensitivity and transient response and there is no lag. The dynamic range of the cell voltage is shown to depend on the ratio of diode capacitance to liquid crystal cell capacitance. The display can be used in a storage mode by erasing with an AC voltage and writing with a constant voltage. The silicon photodiode array is compatible with a CCD frame store using direct minority carrier injection for writing. This light addressed version thus represents a desirable milestone in achieving an all solid-state projection display.

10 Claims, 4 Drawing Sheets

LIGHT ACTIVATED LIGHT VALVE WITH A SILICON CONTROL ELEMENT

FIELD OF THE INVENTION

The present invention relates to light activated light valves and more particularly to an all solidstate light valve with a silicon control element.

BACKGROUND OF THE INVENTION

Light valves are a key element in projection displays. Preferably, such light valves are activated directly by video or data signals, using matrix addressing, or shift registers in combination with matrixing, to input the signals. Liquid crystals and electrochemichromic material have been studied as appropriate light valve media but liquid crystal (LC) has gained greater acceptance to date. For a definition of electrochromic and electrochemichromic material see, I. F. Chang, Nonemissive Electro-Optic Display, edited by A. Kmetz and F. K. Von Willisen, Plenum Press, 1978. Although a variety of drive circuit techniques are under study, active silicon integrated circuit drivers have been shown to be compatible with both liquid crystal and electrochemichromic media and thus presently represent a highly desirable approach for either a direct view or a projection display application (see articles by L. T. Lipton et al, SID Symposium Digest, 8, 64–65, 1977 and D. J. Barclay, et al, SID Symposium Digest, 11, 124–153, 1980). However, the complexity and size of the required silicon chip contribute to high cost and resolution limitations.

An alternative that has received considerable attention, (e.g. see L. T. Lipton et al, SID Symposium Digest, 9, 96–97, 1978), is a valve that uses light addressing or activation, also called a light-activated light valve (see W. P. Bleha et al, Proc. SPIE 317, 179, 1981). In this case, an optical image is applied to the photosensitive back side of the light-activated light valve (LALV) and the light intensity is used to vary the local AC voltage applied across an LC cell. The local cell reflectivity is a function of the magnitude of the cell voltage. In an early implementation, a Se or CdS photoconductive layer was used as the photosensing element that varies the AC voltage, applied to the LC, point by point. The exciting image was produced by a CRT coupled to the photoconductive layer by a lens or a fiber optic plate. A more recent implementation involves a version of the LALV in which the photoconducting layer is replaced by a layer of $SiO_2$ on a single crystal Si as the photodetecting control element (see V. Efron et al, SID Digest of Technical Papers, 142, 1981). A microdiode grid serves to isolate the resolution elements. The resulting MOS diodes are unilateral and must be recharged. Hence, the sign of the voltage across the LC is unchanged, and the device operated in a DC mode. Earlier work used a dynamic scattering mode in the liquid crystal. More recent efforts have utilized a nematic liquid crystal operated in a voltage controlled birefringence mode.

The photoconductivity-controlled, AC liquid crystal LALV is, in principle, a good device. However, photoconductivity generally offers a poor response time-sensitivity tradeoff. Photoconductors exhibit lag which is light level dependent, a nonlinear response (gamma≃½), and are easily damaged by bright light. They exhibit burn-in effects. Photoconducting material has applications limited generally to light sensing. Consequently, a thorough study of the material system, fundamental to its performance characteristics and reliability, may be difficult to justify and is often lacking. The silicon diode version is limited to DC operation.

The present invention is directed generally to replacing the photoconductive and associated light blocking and reflecting layers of the LALV with a monolithic silicon chip containing an array of junction photodiodes and providing an AC voltage across the liquid crystal layer. Prior art examples of such an approach are found in the above-noted V. Efron et al, SID Digest of Technical Papers, 142, 1981, wherein a photoconductor is replaced with a silicon diode array for implementation in vidicons, and in I. F. Chang et al, SID Symposium Digest 102, 1973; Proc. of SID, 16,227, 1975, disclosing an electron beam addressed storage CRT. Since the silicon photodiode array can be addressed by an electron beam directly or via a phosphor coupling, the photodiode array controlled AC liquid crystal light valve can be made as a faceplate for a miniature CRT. Some of the advantages of this approach are: AC liquid crystal cells are more reliable; the interface between the liquid crystal layer and the silicon control structure can be dielectric, suitably processed for liquid crystal alignment; AC operation provides a convenient charge/discharge mechanism, allowing a transient response; and electron beam addressing is an effective way of addressing a high resolution light valve.

SUMMARY OF THE INVENTION

The present invention involves a photodiode-array-controlled display light valve based on silicon technology and liquid crystal display technology. A preferred device can be fabricated with conventional silicon processing techniques, such as etching and diffusion or epitaxial growth on a single crystal silicon wafer, and the photodiode array under AC bias is capable of transferring AC varying voltage across a liquid crystal light valve according to the photoexcitation received. More particularly, a liquid crystal (LC) layer, which may act as a capacitor, is divided and connected to two photodiodes in series with an AC power supply, the circuit being completed with the two diodes connected back to back. Under AC operation, the voltage is dropped over the two half LC capacitors, with one of the diodes being reverse biased at a given time. In response to an applied square wave, each diode will be reverse biased each half cycle with the forward biased diode having a negligible voltage drop. When the photodiodes are activated by light, the voltage across the diode junction capacitance is transferred to the liquid crystal resulting in a field greater than its turn-on threshold field. Depending on the refresh rate and persistance of the exciting light and the RC time constant of the circuit, the LC cell can be operated in a video or in a storage mode. Such a device can easily be extended to a full matrix, say, 1000 by 1000 pels. If the outer electrode (viewing side) is partitioned into electrically floating squares each corresponding to a pel, then the pairs of diodes corresponding to a pel can all be connected in parallel and driven by a single AC source to produce an appropriate array. An implementation of the invention is disclosed wherein in a silicon single crystal wafer is used as the substrate, and by conventional diffusion or epitaxy process, p-n junction diodes are formed in a high resistivity layer which could be epitaxially grown on the substrate. The substrate is then etched away using a self-limiting etching process to stop the etch at the boundary of two different conductivity types. This membrane of silicon with diodes formed, and insulator and electrode regions defined, is then mounted on a glass plate having transparent electrodes defined as pel electrodes, in the manner described above. The liquid crystal is then filled and sealed. Only two electrode leads need to be brought out for the AC power supply connection. The resulting light valve can be directly addressed by a microCRT with a lens or with a high resolution fiber optic faceplate. Alternatively, this light valve can be sealed to a CRT as a faceplate, and can be directly addressed by the electron beam.

Another method of fabricating this light valve is disclosed wherein the photodiodes are formed by planar layers of p-n type and isolation is provided by etching grooves into the substrate.

It will be seen that the disclosed silicon diode array is easy to fabricate in a manner similar to a vidicon target, and exhibits superior performance to a photoconductor in controlling the liquid crystal light valve.

DETAILED DESCRIPTION OF THE INVENTION

Figure 1:
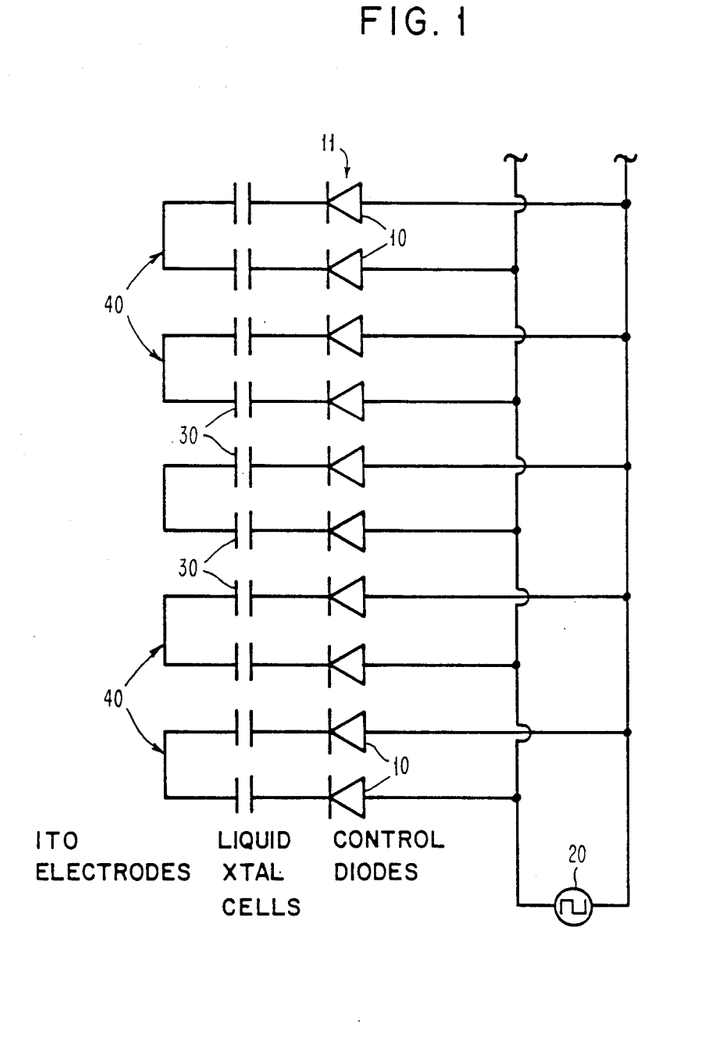
FIG. 1 is a schematic diagram of a photodiode-array-controlled liquid crystal LALV in accordance with the present invention.
Figure 2:
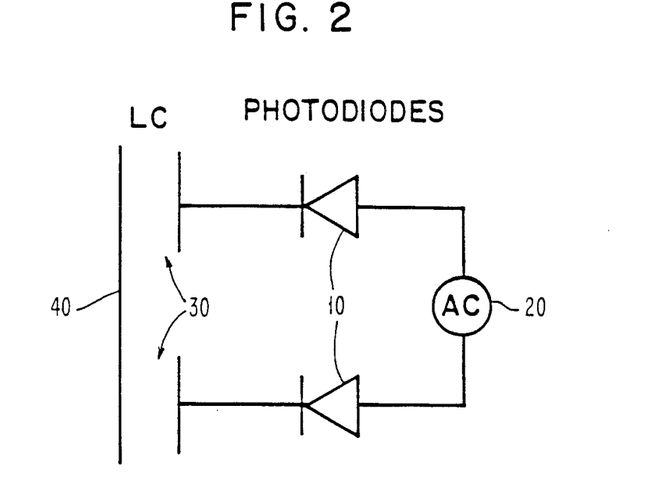
FIG. 2 is a schematic diagram illustrating the structure of an individual photodiode-liquid crystal cell from the LALV in FIG. 1.
Figure 2A:
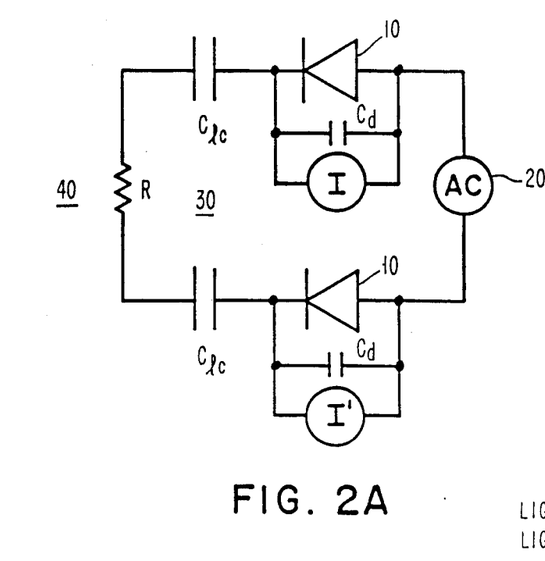
FIG. 2A is an equivalent circuit of the photodiode-liquid crystal cell shown in FIG. 2.

An array 11 of photodioes 10 are paired in rows which are shown perpendicular to the plane of FIG. 1. Each row is provided with a common potential applied to the diodes 10 in that row. Pairs of rows are connected to the same voltage source 20 and inter-row capacitance is held to a minimum. On any given half cycle of the applied square wave, AC voltage, the diodes in every second row are forward biased. The circuit elements are paired by patterning electrodes 40 into isolated, electrically floating rectangles opposite each vertical pair of diodes across liquid crystal cells 30, as seen in FIG. 2. The circuit equivalent for a diode pair is shown in FIG. 2A. At any instant, one diode of a pair is reverse biased and the other is forward biased. The circuit elements are the diode capacitance, $C_d$, the LC cell capacitance, $C_{lc}$, the resistance R of the ITO film making up electrode 40, and the current generators I or I' resulting from dark leakage and illumination of the reverse biased diode. The resistance R is designed to be sufficiently small such that any RC charging time is much less than a half period of the applied AC, and equilibrium is reached during the half cycle. R will be neglected in the following considerations. Leakage in the liquid crystal cell is small and can be ignored except for very low frequency operation. Propagation delay along the rows, which could be a factor for high frequency operation, is similarly ignored. Initially, it is assumed that the diode capacitance Cd is independent of voltage.

In order to understand the operation of the array, three cases may be considered.

Case I. The liquid crystal (LC) cell capacitances of a diode pair have been charged and the illumination is suddenly removed. The diode dark current is assumed to be negligible for the purpose of discussion. This exercise may be used to determine the time constant for decay of stored charge, and the background stored charge resulting from the applied voltage.

Case II. Uniform illumination is applied to a diode pair that is initially uncharged. This exercise may be used to determine the buildup rate and the equilibrium stored charge for the case where both diodes are equally illuminated.

Case III. A single diode of the pair is illuminated and the other is not.

Case III, in combination with Case II, covers the case of nonuniform illuminaton of a diode pair, encountered whenever the image intensity varies along a vertical line. A pair of diodes constitute a vertical PEL. Horizontal resolution is defined by the density of diodes in a given row.

The amplitude of the applied square wave is assumed to be V. The leakage current in the diodes is assumed to be zero, which will not be the actual case. Thus, in what follows, a constant background charge resulting from leakage is ignored. However, there is also a constant background charge resulting from charge pumped by the voltage source. It is assumed that the background charge can be suppressed by the threshold behavior of the LC cell. This is done by setting the applied voltage appropriately so that the background charge is near threshold.

The charge stored in the LC cells is firstly considered. This charge, in turn, determines the voltage that appears across the cell. The magnitude, but not the sign of the voltage, determines the cell reflectivity. It should be noted that the charge on both cells of a pair is the same. The voltages across paired cells are in opposite phases at any instant.

The analysis is straightforward. It consists of calculating the charge stored on each of the capacitors, $C_{lc}$, after each half cycle of the applied square wave voltage, $\pm V$, taking the charge stored from the previous half cycle as the initial condition. The charge generated by the current sources, I or I', during the condition of reverse bias on the respective diodes is taken as the signal charge during any half cycle. The forward drop of the other diode is small at the end of the charging cycle so that the voltage across the capacitors, $C_{lc}$, is almost equal to the applied voltage V. For the time being, the voltage dependence of the diode capacitance is ignored.

A recursion relation for the charge $q_n$ stored on $C_{lc}$ after the $n^{th}$ cycle becomes apparent quickly, and this can be used to develop a series expression for $q_n$ in terms of the initial charge. The series expressions are geometric and are easily summed.

Now, considering the foregoing cases more particularly:

CASE I

At the end of a positive half cycle, a charge $q_o$ is stored on $C_{lc}$ and there is no illumination thereafter.

The stored charge and the $n^{th}$ half cycle following the start of counting is given by:

$$q_n = r^n q_o + (-1)^n C_t V[(1-(-r)^n)/(1+r)] \quad [1]$$

in which $$r = C_t/C_d = C_{lc}/(C_{lc}+2C_d)$$

$$C_t = (2/C_{lc}+1/C_d)^{-1} \quad [2]$$

The ratio r is always less than unity. The capacitance $C_t$ is the total series capacitance across the generator (not counting the inter-row or other shunt capacitance). Since one of the diodes is always forward biased at any instant $C_d$ is counted only once.

The charge, $q_n$, has two components. One originates from the initial charge, $q_o$, and is reduced in magnitude by the factor on each successive half cycle. On a time average basis, taking time instances corresponding to the end of a half cycle, the parameter n may be replaced by:

$$n = 2ft_n$$

in which f is the frequency of the square wave, and $t_n$ the time corresponding to the end of the $n^{th}$ half cycle. Hence, the relationships:

$$r^n = \exp - t_n/\tau$$

$$\tau = (-2f \ln r)^{-1} \quad [3]$$

As f is increased, the rate of decay $\tau - 1$, is increased. As $C_d$ approaches zero, r approaches unity and the time constant approaches infinity. Thus, the diode capacitance plays a key role in providing a transient capability.

The second component in $q_n$ is an alternating charge proportional to $C_t V$. This represents the alternating background charge of magnitude $$q_{background} = C_t V/(1+r) \quad [4]$$

The full term containing $C_t V$ represents the transient buildup behavior of the background charge, were the device just turned on. This would be the case with the simple choice of $q_o = 0$. The transient term in nonalternating. Indeed, had this situation been anticipated and the background charge been included in $q_o$, the transient term would have been absent. Thus, $$q_n = r^n(q_o - C_t V/(1+r)) + (-1)^n C_t V/(1+r)$$

is a more illuminating representation in which the steady decay of the initial signal charge, and the constant background charge, are clearly distinguished.

CASE II

There is uniform illumination; the diodes produce signal charges $q_s$ and $-q_s$ on subsequent half cycles; and there is no initial charge.

The charge after the $n^{th}$ half cycle following a positive half cycle is $$q_n = (-1)^n [r \, q_s + C_t V][(1-(-r)^n)/(1+r)] \quad [5]$$

The background charge is the same as before. The signal charge has a steady state value, which alternates in sign, of $$q_\infty = rq_s/(1+r) \quad [6]$$

and a non-alternating transient component which decays as $r^n$. The transient time constant is similarly $\tau = (-2f \ln r)^{-1}$.

The achievable contrast in the liquid crystal cell depends on the ratio of maximum signal charge to background charge. This may be called the dynamic range. The maximum value of $q_s = \frac{1}{2} C_{lc}$. Thus, the dynamic range, D.R., is $$\begin{aligned} D.R. &= r\left(\frac{1}{2} C_{lc} V\right)/C_t V \\ &= \frac{1}{2} C_{lc}/C_d \\ &= r(1-r) \end{aligned} \quad [7]$$

To achieve a large dynamic range, it is desirable to maximize the ratio $C_{lc}/C_d$. This implies r approaching unity, which increases the response time constant. Thus, there is a tradeoff between dynamic range and response time.

CASE III

Only one diode is illuminated and produces a signal charge $q_s$.

The charge at the end of the $n^{th}$ half cycle following a positive half cycle is, (n=odd)

$$q_n = -rq_s(1-r^{n+1})/(1-r^2) - C_t V(1+r^n)/(1+r) \quad [8]$$

(n=even)

$$q_n = -r^2 q_s(1-r^n)/(1-r^2) + C_t V(1-r^n)/(1+r)$$

The background charge is the same as before. The signal charge has a steady state value $$q_\infty = rq_s/(1-r^2) \quad (n=odd)$$

$$q_\infty = r^2 q_s/(1-r^2) \quad (n=even) \quad [9]$$

and a transient term with the same buildup time. The magnitude of the signal charge, for the second half of a full cycle, is reduced by the factor r, as one might expect. The average signal charge during a full cycle is $$q_\infty | average = \frac{1}{2} rq_s/(1-r) \quad [10]$$

This is different from the uniform illumination case. For $r = \frac{1}{3}$, the two have identical responses. For $r \geq \frac{1}{3}$, the nonuniform illumination component is enhanced and vice versa. This part can be summarized by noting that there is a steady background component, and that transient behavior is characterized by the exponential time constant $\tau = -(2f \ln r)^{-1}$ which for $r = \frac{1}{3}$ is about equal to one half period of the applied AC voltage. The choice $r = \frac{1}{3}$ equalizes the response to uniform and the average of nonuniform illumination and provides a signal charge of $\frac{1}{4}$ the photo charge plus leakage charge produced by the diode during a half cycle. The choice $r = \frac{1}{3}$ corresponds to $C_d = C_{lc}$. The dynamic range is $r/(1-r)$ and for the choice $r = \frac{1}{3}$, has the value $\frac{1}{2}$. To achieve a larger dynamic range requires r closer to unity.

OPERATING MODES

Figure 2B:
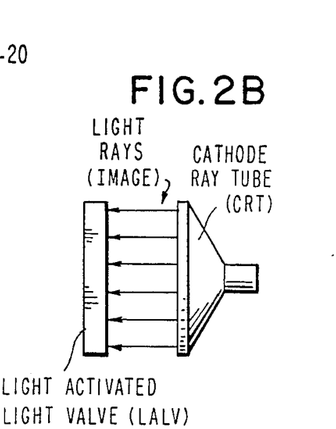
FIG. 2B schematically shows a light-activated light valve and means for projecting an image thereon.

The photodiode LALV of the present invention can be operated in a video or in a storage mode (FIG. 2B). In the video mode, the applied square wave is run at a constant frequency. If the light valve is driven by a CRT (that is, if an image produced by a CRT is projected onto the light valve), the CRT frame rate should be twice the square wave frequency. In this case, integration time is not relevant since the illumination is not steady. However, setting the frame rate at higher multiples of twice the square wave frequency does allow charge accumulation. For slowly varying illumination, the integration time is half the period. In this case, sensitivity and transient response can be traded off simply by varying the drive frequency. For viewing without flicker, the drive frequency should not fall below 60 Hz, although a much lower rate could prove to be acceptable since the flicker is likely to be reduced for a square wave drive.

The photodiode array is also sensitive to electron excitation. Thus, the diode array LALV can be directly activated by the electron beam of a CRT without the intervening phosphor screen and optics.

In the storage mode, the LALV is erased by operation without input light using several cycles of a high frequency square wave. This leaves the target with only the steady state background charge. Then, a steady DC voltage is applied. A single frame scan of the writing CRT imparts the stored charge image to the liquid crystal cell. For this case, n=1 applies and there is no distinction between Case II and Case III. The stored charge is $\pm rq_s$ in either case. A value of r close to unity is desirable. The longer time constant is not relevant except that it increases the number of cycles required for erase. However, the frequency of the square wave during erase can be made high, keeping the erase time low.

The choice r close to unity is probably not especially deleterious to the video mode. It does increase the response time and enhances the response the high spatial frequencies. However, both effects can probably be tolerated. Hence, a display optimized for the storage mode is also useful in the video mode. The greater dynamic range is highly desirable.

For storage, the image is maintained for a relatively long time if the liquid crystal cell is allowed to float in an open circuit mode. Eventually though, the stored charge in the LC layer will leak off and redistribute. However, in a closed circuit mode, dark current leakage in the reverse biased photodiode of each pair gradually adds more charge to the liquid crystal cell and the field eventually saturates. The time constant for storage depends on the diode leakage and capacitance. A time constant of several seconds is possible. The erase-write cycle is then repeated, this time with the opposite sign of DC voltage on the cell to provide field cycling in the cell. The erase-write cycle can be sufficiently fast so that it should not be particularly annoying. The CRT frame time for writing can be longer than in the conventional case, thereby allowing a larger number of PELS.

An alternative way of operating this light valve in storage mode is to use long persistence phosphor in the addressing CRT. In this mode, the light valve is operated under AC and the storage time is controlled by the phosphor persistence time.

SENSITIVITY

The sensitivity of a LALV depends on the photosensor. For silicon diodes with an AR coating, and good geometry, the quantum efficiency can approach 100% over the range 0.4–0.9 micron with the maximum near 0.8 microns. The spectral response drops off rapidly beyond 1 micron. The response is linear (gamma=1) and the diode has no lag. The transient response time constant of the photodiode LALV is roughly equal to the period of the applied square wave voltage. The photodiode is generally more sensitive than a photoconductor except at low light levels. The photodiode has a gain of unity. In a photoconductor, the lifetime of a conduction promoting trap is high at low light levels. This allows high photoconducting gain, but causes high lag. Hence, use at low light levels is not always desirable. The quantum efficiency of a photoconductor is only a few percent. The gain of a photoconductor decreases with increase in light level, so that the charge-light characteristic is not linear (gamma$\simeq\frac{1}{2}$). The sensitivity of a photodiode is essentially independent of voltage. The gain of a photoconductor increases with voltage.

IMPLEMENTATION

Figure 3:
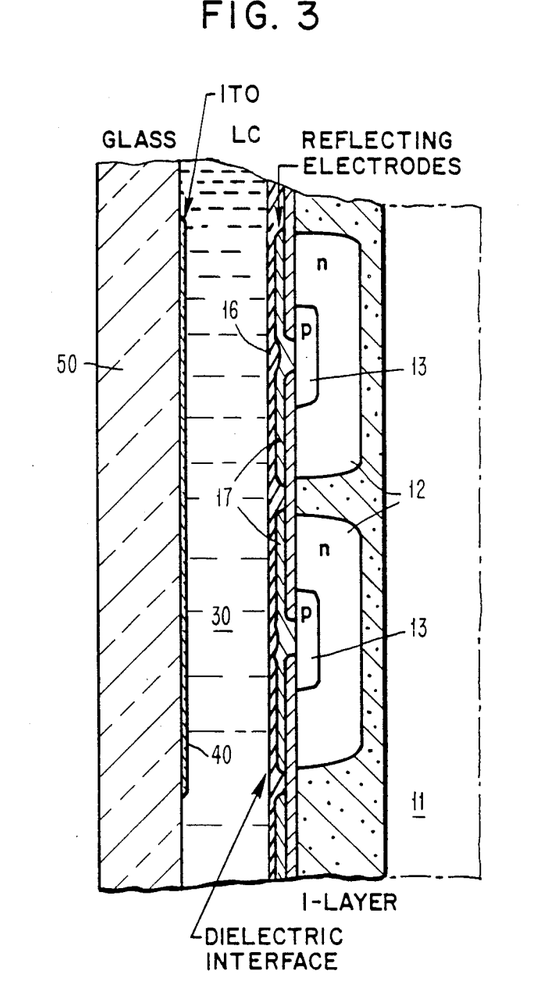
FIG. 3 illustrates one form of constructing the photodiode array controlled LC LALV of the invention.

Two alternative embodiments for achieving the light valve structure schematic of FIG. 1 will now be described. The first embodiment is shown in FIG. 3.

Figure 3A:
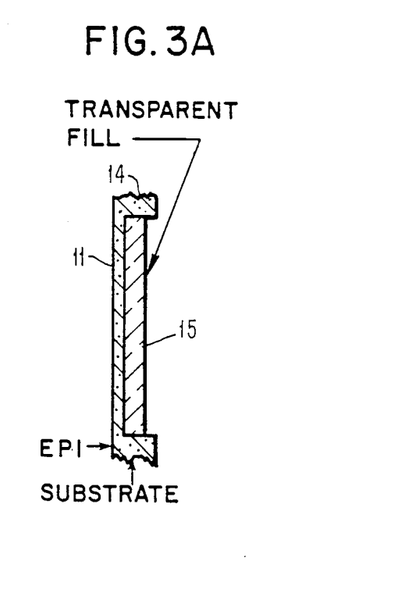
FIG. 3A is a detail view of a portion of the construction of FIG. 3.

The substrate, which may be in the form of a silicon single crystal wafer, is prepared by growing a thick semi-insulating epi layer 11 on a conventional substrate 14 (see FIG. 3A). A deep, patterned n-layer 12 is then diffused producing conducting rows. Alternate rows are connected in common at the periphery. After the n-diffusion, the oxide mask is stripped and a new oxide layer is grown. Holes are opened for the p-diffusion and p-portions 13 are formed. After the p-diffusion, a metal layer is deposited and patterned to place square, isolated metal reflecting electrodes 17 centered over each diode. These squares serve three functions: (1) as electrodes for the LC cell; (2) as reflectors; and (3) as a light blocking layer to protect the photodiode from the projection light. The light path between the metal squares must be blocked.

The original substrate layer is then etched off uniformly down to the grown epi layer in the area opposite the diode array. The region around the diode array is kept thick and provides the supporting member for the thin, light-sensitive area. Uniformity of the thinning is assured by virtue of the large differential etching rate for the two layers that can be achieved. A membrane as thin as 10 microns, stretched over the supporting thick rim, will be structurally sound, yet thin enough to allow collection of the light generated minority carriers (holes for the geometry described) by the photodiode. The exciting light should be in the near IR so that it is absorbed near or within the diffused n-layer 12. The space between metallurgical n-layers, under the openings in the metal, can be subjected to ion bombardment (for example, gold) using the metal as the mask. The light blocking means would then be unnecessary since gold is a strong recombination center. The visible projection light would be absorbed close to the surface, within the implanted region, and virtually none of the minority carriers would reach the diodes.

If desired, the membrane can be stiffened by filling in the etched region with transparent material 15 (see FIG. 3A). The photodiode array is then covered with a dielectric layer 16 which serves two purposes: (1) it becomes one boundary of the liquid crystal cell; and (2) it stiffens the membrane. This membrane of silicon with diodes formed and insulator and electrode regions defined, may then be mounted on a glass plate 50.

One of the features of the choice of sign of conductivity is that the photodiode array can function as a target for imaging as a camera tube. This allows diagnostics, during development, of dark current, sensitivity, spectral response, resolution, diode capacitance, and processing problems leading to defects. In this configuration, both sets of rows are tied together electrically and function as the target backplate. This particular approach has the advantage that direct electron beam scanning of the silicon can be used as an alternative to photon imaging with a CRT as the source.

Figure 4:
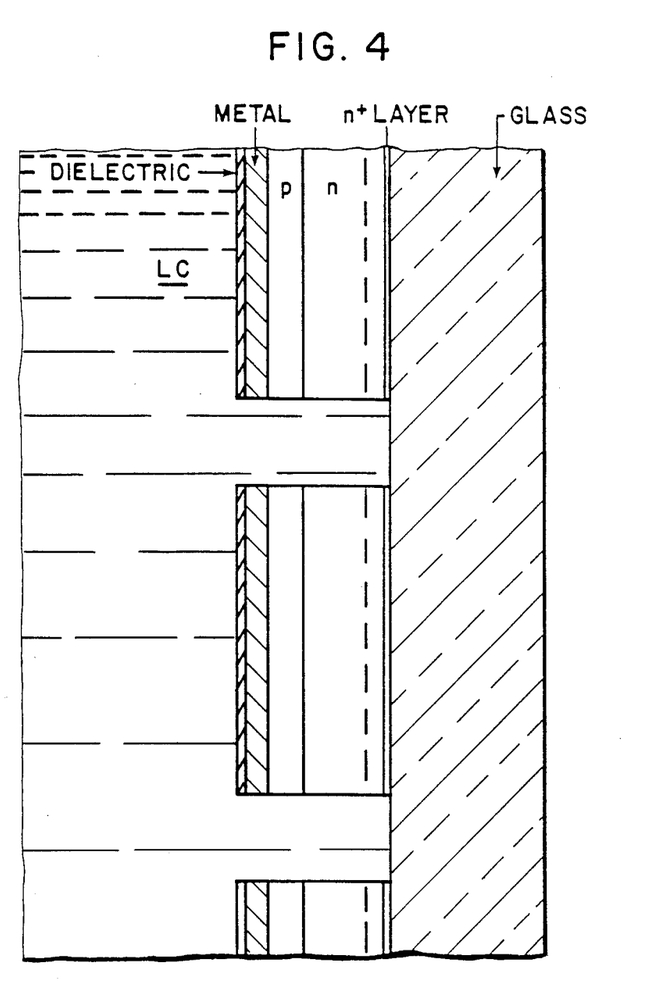
FIG. 4 illustrates an alternate form of constructing the photodiode array controlled LC LALV of the invention.

Another alternate embodiment is shown in FIG. 4. In this case the silicon substrate would be shown on the left if it were not etched off later in the process. It is chosen to be n-type. A uniform p-layer is grown, followed by a several micron thick n-layer. A final, thin n+ layer is either grown or diffused in. The silicon is then mounted and bonded on a sapphire or glass substrate, which serves as the window and as a support for the silicon. The substrate is then etched away down to the p-player. Metal and thin dielectric layers are then deposited uniformly. The horizontal elements of a rectangular grid are then patterned and the silicon etched through to the support. This isolates the rows in an interdigitated finger pattern so that alternating potentials can be applied to the n-layers. The vertical separations are then patterned and the silicon etched part way through. This provides continuity for the rows, yet isolates the diodes in any given row. A dielectric might be applied to provide passivation for the mesa diodes.

The thin n+-layer serves to produce a low surface recombination interface assuring very high collection efficiency for holes produced by visible light. The n+-layer reduces the series resistance of the diode rows.

DESIGN OF THE SILICON PHOTODIODE ARRAY

As indicated above, it is desirable to design the photodiode to have a junction capacitance under reverse bias that is smaller than the capacitance of the LC cell. Typically, an LC cell may operate with a potential of several volts, say 5 volts at 30 Hz. The cell thickness would be 10 microns. Thus, the liquid crystal cell, for a pel size of 25 microns square and a dielectric constant of 5 for the LC, would have a capacitance of about $2 \times 10^{-15}$ F. In order to obtain a smaller photodiode junction capacitance, the design parameters may be determined from the following equation (abrupt junction)

$$C_d = \frac{\sqrt{q \epsilon_{Si} N_{Si}}}{2(V_{bi} + V)} \cdot A$$

where
$\epsilon_{Si}$ is the dielectric constant of silicon;
$N_{Si}$ is the doping level in silicon;
$V_{bi}$ is the built-in voltage $\simeq 19$ volts for $N_{Si} = 10^{15}$ to $10^{16}$ cm$^{-3}$;
V is the bias voltage;
q is the electron charge; and
A is the area of a diode junction.

If a doping level of $2-3 \times 10^{15}$ cm$^{-3}$ is selected, a diode should be designed to have a junction size less than 4 to 5 micron square. This can be done with present day lithography. In general, the diode may be made smaller if higher doping is chosen and vice versa.

ALL SOLID STATE SIGNAL INPUT

The silicon photodiode array has properties which potentially make it a good choice for a LC array control element. As described earlier, the photo-excitation of minority carriers in the bulk silicon substrate and the subsequent diffusion to a reverse biased diode represent the input means. As already indicated, excitation by energetic electron bombardment is also an option. Hence a miniature CRT is a suitable choice for writing. However, there are other options.

It was early recognized by applicants that the charge coupled device (CCD) could be used for display as well as imaging. Specifically, it was appreciated that a frame store CCD in a direct bandgap semiconductor would produce light, if all the depletion region wells in which minority carriers are stored were simultaneously collapsed. The in-rushing majority carriers would combine radiatively with the minority carriers and produce light in proportion to the stored charge. The local variations in stored charge would produce an optical image.

Silicon, being an indirect bandgap semiconductor, would be unsuitable for the write CCD, but GaAs, which has been demonstrated to be suitable for CCDs, would be effective. The emitted radiation at 0.88 microns would be near the peak of the silicon photodiode sensitivity. A sandwich structure, consisting of a GaAs CCD frame store and the silicon diode array LALV would provide an all solid-state solution.

The long diffusion length of minority carriers in silicon, which makes it an inefficient light emitter and an efficient photodiode, provides a mechanism for directly injecting minority carriers into the photodiode array substrate. One implementation may have a silicon substrate with a CCD frame store opposing the photodiode array. Operation of the CCD during write would be independent of the operation of the light valve control element.

Following application of voltage to the diode array, the depletion regions of the fully filled frame store are collapsed and replaced by an accumulation region at the substrate interface. This injects the stored minority carriers into the substrate and keeps them from returning to the interface. The minority carriers diffuse virtually without loss to reverse biased diodes. Lateral diffusion, in combination with the nonzero thickness of the substrate, causes a loss of resolution. This is minimized by keeping the thickness of the bulk region small compared to the spatial extent of the diode pair, implying substrate thickness in the range of 25–50 microns. Double-sided processing under these circumstances while difficult may be achievable.

The video rate for a CCD can greatly exceed what is posible for a CRT. This makes possible a high resolution light valve operating at a standard frame rate.

The CCD version described here differs from the Hughes CCD light valve described by Little et al, in SID Digest, 13,250, 1982, in the mechanism of using the injected minority carriers to control the state of the liquid crystal and the use of AC, rather than DC across the LC.

It will be seen that a new silicon control element for a light-activated light valve has been described which replaces a homogeneous photoconductive layer in a conventional, AC light activated light valve. Although it is more complex than the homogeneous photoconductor, it is comparatively simple in terms of state-of-the-art silicon technology. Using the silicon control element as described herein one can realize a number of advantages relating to basic understanding of the material system (liquid crystal) compatibility with the requirements of the light valve-sensitivity, lag, linearity of light response, ruggedness, and ability to withstand high overloads. In addition, the simple structure of silicon diodes offers the potential for high yield and low cost and thus it can be the basis for an effective light-activated, light valve system. This control element combined with a CCD frame store provides an all solid-state light valve.

Having thus described our invention, what we claim as new and desire to secure by Letters Patent is:

1. A light-activated light valve comprising:
    a liquid crystal layer having first and second opposite sides;
    a first electrode arranged on the first side of the liquid crystal layer;
    a first diode having a pn junction formed by a region of a first conductivity type in contact with a region of a second conductivity type, the region of the first conductivity type being in electrical contact with the second side of the liquid crystal layer opposite a first part of the first electrode;
    a second diode having a pn junction formed by a region of the first conductivity type in contact with a region of the second conductivity type, the region of the first conductivity type being in electrical contact with the second side of the liquid crystal layer opposite a second part of the first electrode, the first and second diodes being spaced from and electrically insulated from each other; and
    means for applying an alternating voltage across the second conductivity type regions of the first and second diodes.

2. A light-activated light valve as claimed in claim 1, further comprising:
    a second electrode arranged on the second side of the liquid crystal layer opposite a part of the first electrode, said second electrode being in electrical contact with the region of the first conductivity type of the first diode; and
    a third electrode arranged on the second side of the liquid crystal layer opposite a part of the first electrode, said third electrode being in electrical contact with the region of the first conductivity type of the second diode.

3. A light-activated light valve as claimed in claim 2, further comprising means for projecting light onto the first and second diodes.

4. A light-activated light valve as claimed in claim 2, characterized in that:
    the diodes are photodiodes; and
    the liquid crystal layer comprises a dielectric layer formed on its second side.

5. A light-activated light valve array comprising:
    a plurality of light activated light valves as claimed in claim 1, said light valves having a single continuous liquid crystal layer common to all light valves in the array; and
    means for projecting an image onto the diodes in the light valve array.

6. A light-activated light valve array as claimed in claim 5, characterized in that:
    the second conductivity type regions of all of the first diodes in the array are electrically connected to each other; and
    the second conductivity type regions of all of the second diodes in the array are electrically connected to each other.

7. A light-activated light valve comprising, in a series electrical circuit:
    a liquid crystal device;
    a first photodiode arranged in the circuit to conduct in a first direction;
    a second photodiode arranged in the circuit to conduct in a second direction opposite the first direction; and
    means for supplying an alternating voltage.

8. A light-activated light valve as claimed in claim 7, characterized in that the liquid crystal device comprises first and second liquid crystal cells.

9. A method of manufacturing a light-activated light valve, said method comprising the steps of:
    providing a substrate of a first conductivity type, said substrate having a surface;
    forming at the surface of the substrate a first region of a second conductivity type;
    forming at the surface of the substrate a second region of the second conductivity type, said second region being spaced from and electrically insulated from the first region;
    forming at the surface of the substrate a first electrode in electrical contact with the first region;
    forming at the surface of the substrate a second electrode in electrical contact with the second region;
    forming a liquid crystal layer having first and second opposite sides, the first side of the liquid crystal layer being arranged adjacent the first and second electrodes; and
    forming a third electrode adjacent the second side of the liquid crystal layer, said third electrode being arranged opposite the first and second electrodes.

10. A method as claimed in claim 9, characterized in that the first and second regions are formed by diffusion through openings in a mask.

* * * * *